(12) United States Patent
Sobel

(10) Patent No.: US 10,181,057 B2
(45) Date of Patent: *Jan. 15, 2019

(54) MOBILE DEVICE AUTO WIPE

(71) Applicant: Facebook, Inc., Menlo Park, CA (US)

(72) Inventor: Jason S. Sobel, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,265

(22) Filed: Aug. 5, 2015

(65) Prior Publication Data

US 2015/0347788 A1 Dec. 3, 2015

Related U.S. Application Data

(63) Continuation of application No. 13/661,934, filed on Oct. 26, 2012, now Pat. No. 9,131,381.

(51) Int. Cl.
G06F 21/88 (2013.01)
H04W 12/08 (2009.01)
H04L 29/06 (2006.01)
G06F 21/62 (2013.01)
H04W 12/02 (2009.01)

(52) U.S. Cl.
CPC .............. G06F 21/88 (2013.01); G06F 21/62 (2013.01); H04L 63/105 (2013.01); H04W 12/02 (2013.01); H04W 12/08 (2013.01); G06F 2221/2111 (2013.01); G06F 2221/2149 (2013.01)

(58) Field of Classification Search
CPC .. G06F 21/88; G06F 21/62; G06F 2221/2111; G06F 2221/2149; H04L 63/105; H04W 12/02; H04W 12/08
See application file for complete search history.

(56) References Cited

U.S. PATENT DOCUMENTS

2013/0260720 A1* 10/2013 Miyaki ................. H04W 12/08 455/411
2014/0033299 A1* 1/2014 McGloin ................. G06F 21/60 726/18

* cited by examiner

Primary Examiner — Brandon S Hoffman
Assistant Examiner — Nega Woldemariam
(74) Attorney, Agent, or Firm — Baker Botts L.L.P.

(57) ABSTRACT

In particular embodiments, a method may include automatically determining that a mobile computing device is unlocked and away from a pre-determined trusted user associated with the mobile computing device, where the determining that the mobile computing device is away from the pre-determined trusted user is based on communication between the mobile computing device and an identification device carried by the trusted user, and by the mobile computing device, automatically erasing all software and data on the mobile computing device. The identification device may include a BLUETOOTH fob, a Near-Field Communication (NFC) tag, or a Radio-Frequency Identification (RFID) tag. The method may include communicating with the identification device to verify that the identification device is in a vicinity of the mobile computing device. The communication may be via a communication protocol such as BLUETOOTH, a Near-Field Communication (NFC), or Radio-Frequency Identification (RFID).

20 Claims, 3 Drawing Sheets

MOBILE DEVICE AUTO WIPE

PRIORITY

This application is a continuation under 35 U.S.C. § 120 of U.S. patent application Ser. No. 13/661,934, filed 26 Oct. 2012, which is incorporated herein by reference.

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a mobile computing device may protect data stored on the mobile computing device by automatically erasing all data from itself in response to a security event. The security event may be the mobile computing device being unlocked and away from a trusted location associated with the mobile computing device.

DESCRIPTION OF EXAMPLE EMBODIMENTS

A computing device may lock its display after a specified period of user inactivity (e.g., after one minute) for security reasons. The locked display or locked screen may prevent a user to interact with applications of the computing device. The locked screen may display one or more visual cues for a user to unlock the locked screen. For example, a locked screen of a computing device may provide a user input field for a user to enter a password to unlock the screen. The user may enter a password using a physical keyboard or a touch-screen keyboard of the computing device.

In addition to password protection, other security measures may be applied to a computing device. For example, a computing device such as a desktop computer or a server can be secured within a physical location (e.g., an office building with restricted access) to protect data stored on the computing device. However, for a mobile computing device, security for the data stored on the mobile computing device can be comprised if the mobile computing device leaves a secured physical location and the mobile computing device is not properly protected by security measures (e.g., as protected by a locked screen). Particular embodiments describe methods for protecting software and data stored on a mobile computing device. Particular embodiments may automatically erase all software and data stored on a mobile computing device if a security event occurs with the mobile computing device.

Figure 1:
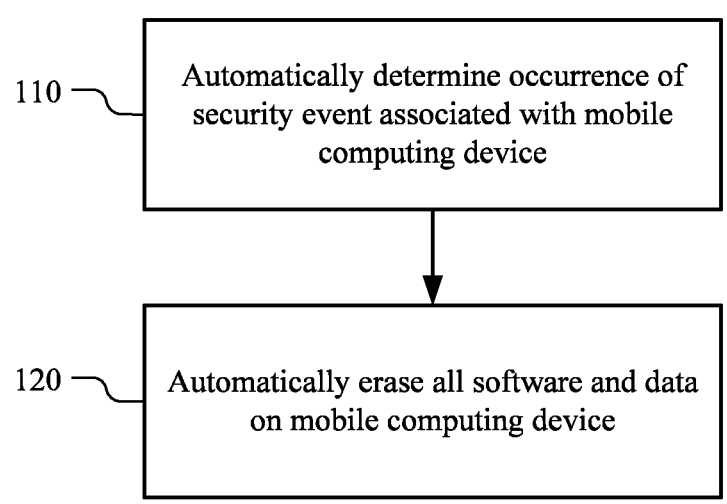
FIG. 1 illustrates an example method for automatically erasing software and data on a mobile device based on an occurrence of a security event associated with the mobile computing device.

FIG. 1 illustrates an example method 100 for automatically erasing software and data on a mobile device based on an occurrence of a security event associated with the mobile computing device. The example method 100 may be implemented by a mobile computing device. For example, the example method 100 may be implemented by a process of an application (or an operating system) running on one or more processors of the mobile computing device. The example method 100 may begin at step 110, where the mobile computing device may automatically determine an occurrence of a security event associated with the mobile computing device.

In particular embodiments, the security event may comprise the mobile device being unlocked and away from a pre-determined trusted geo-location associated with the mobile computing device. The mobile device may determine its geo-location based on GPS signals, locations of WLAN access points, or cellular signal triangulation. This disclosure contemplates any suitable methods for determining a geo-location of a mobile computing device. A trusted geo-location may be a location or area of a trusted location such as a person's home, an office building, a manufacturing facility, a laboratory, and so on. A trusted geo-location may be represented with geographical coordinates, an geographical area, a list of one or more WLAN access points, a list of one or more WLAN networks (e.g., a list of WLAN service set identifiers or SSIDs), or any suitable representations. A user or a system administrator may assign a trusted geo-location to the mobile computing device and store the trusted geo-location on the mobile computing device (e.g., in a local storage of the mobile device). In particular embodiments, the mobile computing device may determine that it is unlocked (e.g., for over one minute) and determine its current geo-location. And the mobile computing device may access the trusted geo-location (e.g., as stored on the mobile computing device) and determine that the security event occurs if its current location is at least a specified distance away (e.g., at least 500 meters away) from the pre-determined trusted geo-location.

In particular embodiments, the security event may comprise the mobile computing device being unlocked and away from a pre-determined trusted user associated with the mobile computing device. A trusted user may be an owner or an authorized user of the mobile computing device. The mobile computing device may determine whether it is away from the trusted user based on communication between the mobile computing device and an identification device which the trusted user carries (e.g., in his/her pocket). For example and without limitation, an identification device may be a BLUETOOTH fob, an NFC tag, or a Radio-Frequency Identification (RFID) tag. The trusted user (or a system user) may store information of the identification device on the mobile computing device (e.g., in a local storage of the mobile computing device). In particular embodiments, the mobile computing device may communicate with the identification device (based on the corresponding communication protocol) to verify that the identification device (thus the trusted user) is in a vicinity of the mobile computing device. In particular embodiments, the mobile device may determine that it is unlocked (e.g., for over one minute), access information of the identification device stored on the mobile computing device, and determine that it is away from the trusted user if the mobile computing device cannot establish communication (or has lost communication) with the identification device.

In particular embodiments, the security event may comprise the mobile computing device moving a pre-determined distance over a pre-determined amount of time while unlocked. For example, an unauthorized person may snatch away the mobile computing device while the mobile device is unlocked. The mobile device may detect an occurrence of such a security event by determining whether the mobile computing device has move over a pre-determined distance (e.g., 300 meters) over a pre-determined amount of time (e.g., a minute) while the mobile computing device is unlocked.

Figure 2:
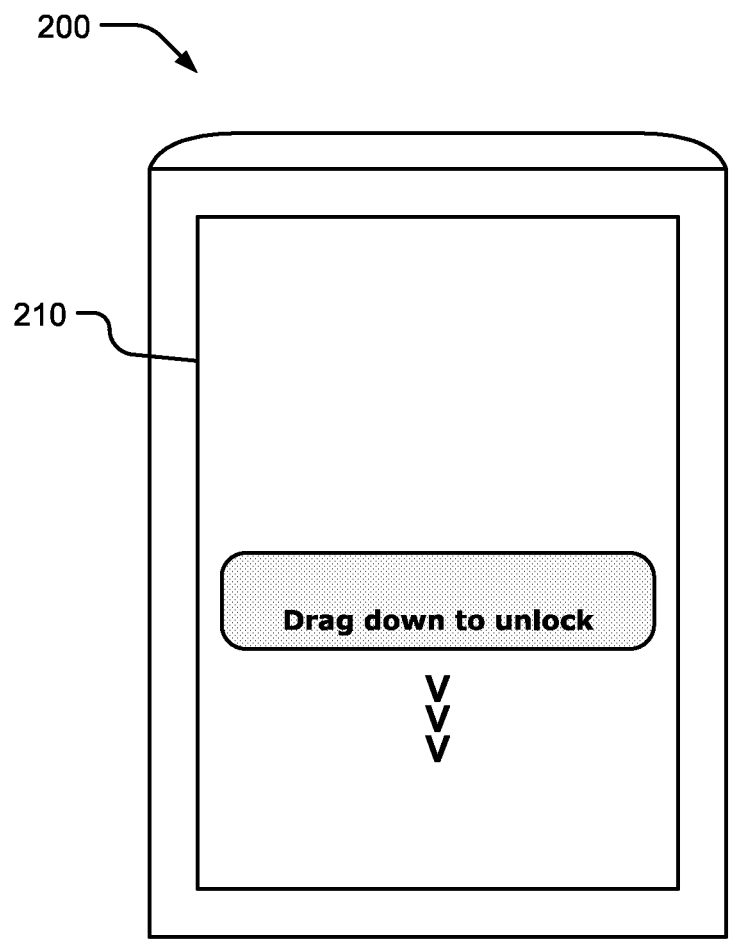
FIG. 2 illustrates an example mobile computing device.

In particular embodiments, the security event may comprise a user performing an incorrect touch gesture to unlock the mobile computing device. For example, the security event may occur when a person enters a wrong password with a touch-screen keyboard of the mobile computing device. In some embodiments, the mobile computing device may provide on a display of the mobile computing device a visual cue to the user to prompt the user to perform the incorrect touch gesture. FIG. 2 illustrates an example mobile computing device 200 with a touch display 210. For example, a locked screen of the example mobile computing device 200 may display a visual cue of a bar and a text string "Drag down to unlock," as illustrated in FIG. 2. However, the correct way of unlocking the locked screen of the example mobile computing device 200 may be a side-way swipe touch gesture performed on the touch display 210, while the correct way is only known to a trusted user of the example mobile computing device 200. The example mobile computing device 200 may determine that the security event occurs if the example mobile computing device 200 detects the incorrect touch gesture as suggested by the locked screen (i.e., a person performs a downward swipe touch gesture on the locked display).

In particular embodiments, the security event may comprise entry of an incorrect password a pre-determined consecutive number of times. For example, the mobile computing device may determine that the security event occurs when an incorrect password has been entered consecutively for three times.

At step 120, the mobile computing device may automatically erase all software and data on the mobile computing device. For example, if the mobile computing device determines a security event of a user performing an incorrect touch gesture to unlock the mobile computing device occurs, the mobile computing device may automatically erase all software and data one the mobile computing device. In some embodiments, if the mobile computing device determines a security event occurs, the mobile computing device may further determine whether the mobile computing device is away from a trusted geo-location associated with the mobile computing device (or away from a trusted user associated with the mobile computing device). The mobile computing device may erase all software and data on the mobile computing device only if the mobile computing device is away from the trusted geo-location (or the trusted user).

In one embodiment, the mobile computing device may automatically sending from the mobile computing device to another computing device (e.g., another computing device or a phone of the owner or a system administrator of the mobile computing device) a message (e.g., an email, a text message, a voice message, and so on) indicating all software and data on the mobile computing device was erased. Yet in another embodiment, the mobile computing device may automatically erase all software and data on the mobile computing device without instructions (or confirmations) from another computing device.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

In particular embodiments, a user (or a system administrator) of the mobile computing device may determine an occurrence of a security event associated with the mobile computing device. For example, the user may determine a security event has occurred if the mobile computing device cannot be located for a pre-determined period of time (e.g., 12 hours). The user may send a push notification (from another computing device) to the mobile computing device, causing the mobile computing device to erase all software and data on the mobile computing device. The push notification may be an email message, an Short Message Service (SMS) message, or any suitable message that is sent to the mobile computing device from another computing device. In other embodiments, the mobile computing device may, after an occurrence of a security event, automatically erase all software and data on the mobile computing device when the mobile computing device establishes a network connection. For example, the mobile computing device may automatically request a connection to a web server of a particular website when the mobile computing device establishes a network connection. The user may determine an occurrence of a security event, and register a service with the web server. In response to the mobile computing device's connection request with the server, the service may enable the server to send a push notification to the mobile computing device, causing the mobile computing device to erase all software and data on the mobile computing device. For another example, the mobile computing device may, after an occurrence of a security event, attempt to establish a network connection with another computing device (e.g., a server). The mobile computing device may, after establishing a network connection with a server, automatically erase all software and data on the mobile computing device. The mobile computing device may also send to the server a message indicating all software and data on the mobile device has been erased.

Figure 3:
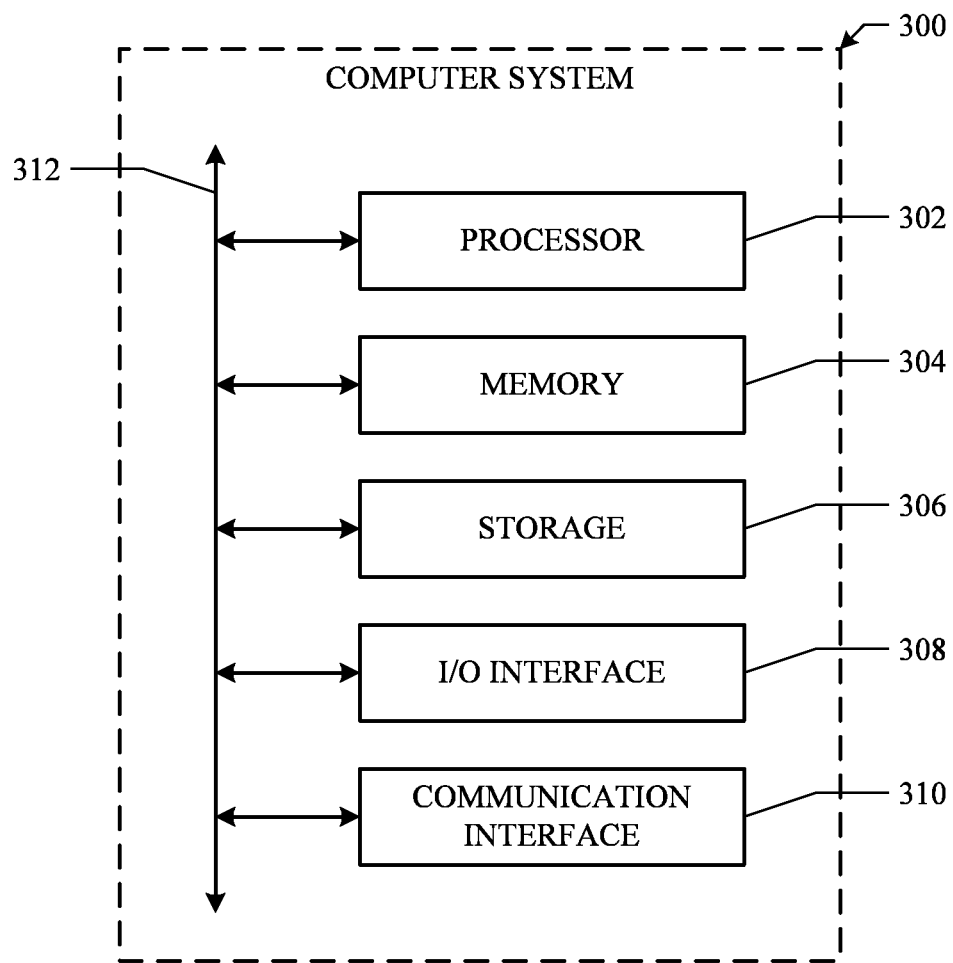
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation look-aside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more computing devices, receiving a request from a trusted user to register a service for a mobile computing device in response to detecting a security event related to the mobile computing device, the security event comprising at least a determination that the mobile computing device is away from a trusted location and that an incorrectly performed touch gesture for unlocking the mobile computing device was performed, wherein the trusted location comprises one or more fixed geographic locations associated with the trusted user;

by the one or more computing devices, sending a request to the mobile computing device to establish a network connection;

by the one or more computing devices, establishing the network connection with the mobile computing device; and by the one or more computing devices, sending a push notification to the mobile device, the push notification comprising instructions to erase software and data on the mobile computing device, wherein the incorrectly performed touch gesture is received in response to a prompt from the mobile computing device to perform an incorrect touch gesture.

2. The method of claim 1, further comprising:
by the one or more computing devices, determining, based on communication between the mobile computing device and an identification device carried by the trusted user associated with the mobile computing device, that the mobile computing device is unlocked and away from one or more of the fixed geographic locations associated with the trusted user.

3. The method of claim 2, wherein the determining that the mobile computing device is unlocked comprises determining that the mobile computing device has been unlocked for at least a threshold period of time.

4. The method of claim 2, wherein the identification device comprises a BLUETOOTH fob, a Near-Field Communication (NEC) tag, a Radio-Frequency identification (RFID) tag, or a combination thereof.

5. The method of claim 2, further comprising:
by the one or more computing devices, communicating with the identification device to verify that the identification device is in a geographic vicinity of one or more of the fixed geographic locations associated with the trusted user.

6. The method of claim 5, wherein the communicating is via a communication protocol that comprises BLUETOOTH, a Near-Field Communication (NFC), Radio-Frequency Identification (RFID), or a combination thereof.

7. The method of claim 2, wherein the determining that the mobile computing device is away from one or more of the fixed geographic locations associated with the trusted user comprises:
by the one or more computing devices, accessing information associated with the identification device and stored on the mobile computing device,
wherein the mobile computing device is away from one or more of the fixed geographic locations associated with the trusted user when the mobile computing device cannot communicate with the identification device.

8. The method of claim 7, wherein the mobile computing device cannot communicate with the identification device when the mobile computing device cannot establish communication with, or has lost communication with, the identification device.

9. The method of claim 1, wherein the security event occurs when the mobile computing device moves a pre-determined distance over a pre-determined amount of time while unlocked.

10. The method of claim 1, wherein the security event occurs when the mobile computing device cannot be located for at least a pre-determined period oaf time.

11. The method of claim 1, further comprising:
by the one or more computing devices, registering the service for the mobile computing device in response to determining an occurrence of the security event.

12. One or more computer-readable non-transitory storage media embodying software that is operable when executed to:
receive a request from a trusted user to register a service for a mobile computing device in response to detecting a security event related to the mobile computing device, the security event comprising at least a determination that the mobile computing device is away from a trusted location and that an incorrectly performed touch gesture for unlocking the mobile computing device was performed, wherein the trusted location comprises one or more fixed geographic locations associated with the trusted user;
send a request to the mobile computing device to establish a network connection;
establish the network connection with the mobile computing device; and
send a push notification to the mobile device, the push notification comprising instructions to erase software and data on the mobile computing device,
wherein the incorrectly performed touch gesture is received in response to a prompt from the mobile computing device to perform an incorrect touch gesture.

13. The media of claim 12, wherein the software is further operable when executed to:
determine, based on communication between the mobile computing device and an identification device carried by the trusted user associated with the mobile computing device, that the mobile computing device is unlocked and away from one or more of the fixed geographic locations associated with the trusted user.

14. The media of claim 13, wherein the determining that the mobile computing device is unlocked comprises determining that the mobile computing device has been unlocked for at least a threshold period of time.

15. The media of claim 13, wherein the identification device comprises a BLUETOOTH fob, a Near-Field Communication (NFC) tag, a Radio-Frequency identification (RFID) tag, or a combination thereof.

16. The media of claim 13, wherein the software is further operable when executed to:
communicate with the identification device to verify that the identification device is in a geographic vicinity of one or more of the fixed geographic locations associated with the trusted user.

17. A system comprising: one or more processors; and a memory coupled to the processors comprising instructions executable by the processors, the processors being operable when executing the instructions to:
receive a request from a trusted user to register a service for a mobile computing device in response to detecting a security event related to the mobile computing device, the security event comprising at least a determination that the mobile computing device is away from a trusted location and that an incorrectly performed touch gesture for unlocking the mobile computing device was performed, wherein the trusted location comprises one or more fixed geographic locations associated with the trusted user;
send a request to the mobile computing device to establish a network connection;
establish the network connection with the mobile computing device; and
send a push notification to the mobile device, the push notification comprising instructions to erase software and data on the mobile computing device, wherein the incorrectly performed touch gesture is received in response to a prompt from the mobile computing device to perform an incorrect touch gesture.

18. The system of claim 17, the processors being further operable when executing the instructions to:
determine, based on communication between the mobile computing device and an identification device carried by the trusted user associated with the mobile computing device, that the mobile computing device is unlocked and away from one or more of the fixed geographic locations associated with the trusted user.

19. The system of claim 18, wherein the determining that the mobile computing device is unlocked comprises determining that the mobile computing device has been unlocked for at least a threshold period of time.

20. The system of claim 18, the processors being further operable when executing the instructions to:
communicate with the identification device to verify that the identification device is in a vicinity of the mobile computing device.

\* \* \* \* \*